US012570052B2

(12) United States Patent
Vier

(10) Patent No.: US 12,570,052 B2
(45) Date of Patent: Mar. 10, 2026

(54) METHOD AND DEVICE FOR PRODUCING A WALL OF AN OBJECT

(71) Applicant: Ottobock SE & Co. KGaA, Duderstadt (DE)

(72) Inventor: Leonard Vier, Duderstadt (DE)

(73) Assignee: Ottobock SE & Co. KGaA, Duderstadt (DE)

( * ) Notice: Subject to any disclaimer, the term of this patent is extended or adjusted under 35 U.S.C. 154(b) by 124 days.

(21) Appl. No.: 18/539,925

(22) Filed: Dec. 14, 2023

(65) Prior Publication Data

US 2024/0208150 A1 Jun. 27, 2024

(30) Foreign Application Priority Data

Dec. 22, 2022 (DE) ..................... 10 2022 134 523.8

(51) Int. Cl.
| | |
|---|---|
| *B29C 64/386* | (2017.01) |
| *B29C 64/106* | (2017.01) |
| *B33Y 10/00* | (2015.01) |
| *B33Y 50/00* | (2015.01) |

(52) U.S. Cl.
CPC .......... *B29C 64/386* (2017.08); *B29C 64/106* (2017.08); *B33Y 10/00* (2014.12); *B33Y 50/00* (2014.12)

(58) Field of Classification Search
CPC ......... B33Y 10/00; B33Y 50/02; B33Y 50/00; B29C 64/386; B29C 64/209; B29C 64/106; B29C 64/393; B29C 64/118
See application file for complete search history.

(56) References Cited

U.S. PATENT DOCUMENTS

2016/0067918 A1* 3/2016 Millar ................... B29C 64/106
425/375
2023/0347573 A1 11/2023 Finke

FOREIGN PATENT DOCUMENTS

DE 10 2020 118 033 A1 1/2022

OTHER PUBLICATIONS

Farell: "What is the PrusaSlicer Fuzzy Skin Setting and How to Use It?", https://howto3dprint.net/prusaslicer-fuzzy-skin-setting/, Oct. 12, 2022.
Blgecko: "Saw someone post a Cura "fuzzy-skin" picture. Figured I'd post one of a print I did a while back using modifier meshes to turn the fuzzy skin off only in specific areas." https://www.reddit.com/r/3Dprinting/comments/cdsws8/saw_someone_post_a_cura_fuzzyskinpicture_figured/, Jul. 16, 2019.
ESPR14: "prusa3d/PrusaSlicer, Fuzzy skin #2010 comments", https://github.com/prusa3d/PrusaSlicer/issues/2010/, 2019.

* cited by examiner

*Primary Examiner* — Monica A Huson
(74) *Attorney, Agent, or Firm* — WCF IP

(57) ABSTRACT

A method for producing at least one wall of a three-dimensional object includes an additive manufacturing process in which at least one manufacturing material is fed in a free-flowing state from at least one feed-in opening of at least one feed-in needle into a supporting material and then cures. The wall extends along a course which comprises a first lateral surface and a second lateral surface opposite the first. The feed-in needle is moved through the supporting material along a printing path, and the printing path corresponds to a path of progression along the course of the wall on which a texturing path is superimposed.

12 Claims, 3 Drawing Sheets

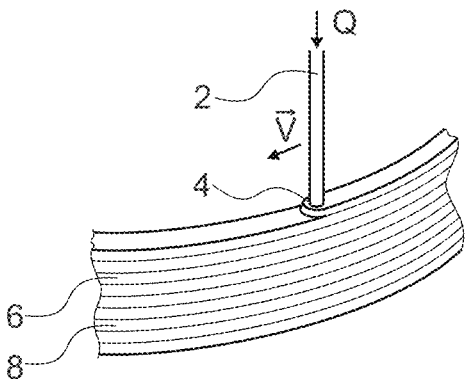
Fig. 1
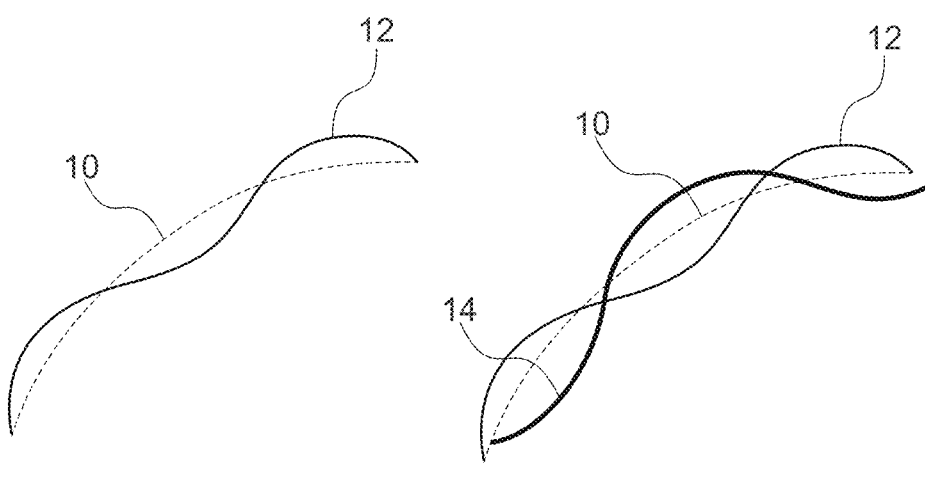
Fig. 2                    Fig. 3

12

12

12

METHOD AND DEVICE FOR PRODUCING A WALL OF AN OBJECT

FIELD OF THE INVENTION

The invention relates to a method for producing at least one wall of a three-dimensional object by means of an additive manufacturing process in which at least one manufacturing material is fed in a free-flowing state from at least one feed-in opening of at least one feed-in needle into a supporting material and then cured, wherein the wall extends along a course of the wall and comprises a first lateral surface and a second lateral surface opposite the first, the feed-in needle being moved through the supporting material along a printing path. The invention also relates to a method for creating a printing path for such a method.

BACKGROUND

Nowadays, many types of additive manufacturing process are known from the prior art and are used to produce a wide range of three-dimensional objects. Traditionally, additive manufacturing processes are hardly suitable for producing large quantities of the respective objects, as the production of individual objects takes a lot of time. In additive manufacturing processes, especially 3D printing, the object to be produced is built up of a number of very thin layers arranged on top of each other, which are often just a few millimetres thick. The production of large objects in particular is therefore very time-consuming.

In the last few years, a great deal of progress has been made in this area. For example, MIT developed a three-dimensional printing process that was published in US 2018/281295 A1, for example. Such a method is known as "Rapid Liquid Printing" (RLP). In this case, the object to be produced is made in a container that contains a gel suspension or another material as a support material which does not chemically react with the manufacturing material. It serves only to support the manufacturing material as long as it is not yet sufficiently cured. Within the scope of the present invention, "curing" also refers to cross-linking or another process by way of which the free-flowing manufacturing material transforms into a non-free-flowing state. In the method, the manufacturing material is introduced into the support material in a free-flowing state, for example as a liquid or gel, at the desired positions. To this end, at least one feed-in needle is used, which has at least one feed-in opening.

Today, such RLP methods are used to print prosthesis liners, for example, which are worn as an intermediate layer between an amputation stump and a prosthesis socket on which further prosthesis elements are arranged. The prosthesis liner is worn directly on the skin, so that the feel is an important factor regarding comfort when worn. Consequently, the side facing the skin must be specially designed to render the prosthesis liner and the prosthesis arranged over it as comfortable as possible for the wearer. However, the same also applies to the opposite side facing away from the skin, as this is the side that can be touched and handled when the liner is worn. The form of this outer side of the liner also constitutes a design feature and therefore a recognisable feature.

A liner has an open proximal end into which the amputation stump is inserted. It also has a closed distal end where, in some embodiments, an attachment element is located, by means of which a mechanical connection can be established between the distal end of the liner and a prosthesis socket.

However, such an attachment element is not necessary for all embodiments. Consequently, liners exist that do not have such an attachment element. In this case, the required hold between the liner drawn over the amputation stump and the prosthesis socket is achieved by creating a negative pressure between the liner and the prosthesis socket. The direction that extends from the distal end to the proximal end or vice-versa is referred to as the longitudinal direction of the liner.

The liner has a wall which, in this case, constitutes the wall of the three-dimensional object. The first lateral surface and the second lateral surface are then formed by the inner side and outer side of the liner, the inner side of the liner being the side that comes into contact with the wearer's skin when worn. The outer side of the liner is the side opposite the inner side. It is irrelevant for the function of the present invention whether the inner side is the first lateral surface or the second lateral surface. It is only important that the outer side forms the respective other lateral surface.

The wall of the liner extends along the course of the wall. This corresponds to the contour of the cross-section of the liner. Many standard liners have a circular cross-section, wherein the diameter of this circle increases from the distal end to the proximal end. In this case, the wall extends along this circle, thereby forming the course of the wall. However, the course of the wall does not have to be circular. It may also be oval, ellipsoid or free-form. It can also be different at different points along the longitudinal direction of the liner. In an additive manufacturing process, such as RLP, the manufacturing material is introduced into the support material through at least one feed-in opening of the feed-in needle. The amount of manufacturing material introduced is dosed and aligned to the speed at which the feed-in needle moves along the printing path in such a way that the width of the strand of manufacturing material introduced corresponds to the width of the wall. The printing path therefore corresponds to the course of the wall.

The disadvantage is that neither the first lateral surface nor the second lateral surface of the wall produced by the RLP process can be provided with a structure or texture. DE 10 2020 118 034 A1 discloses a device that can be used to perform an RLP process, wherein the feed-in needle used features a tool in the area of the feed-in opening with which at least one lateral surface of the wall to be produced can be processed. However, this is generally done to smooth the respective lateral surface and/or improve adhesion between a current layer of the introduced manufacturing material and a previously introduced layer.

SUMMARY

The invention is therefore based on the task of further developing a method in such a way that the disadvantages of the prior art are eliminated or at least reduced.

The invention solves the addressed task by way of a method characterized in that the printing path corresponds to path of progression along the course of the wall, on which a texturing path is superimposed. Unlike in the prior art, the feed-in needle is therefore not only moved through the support material along the path of progression that corresponds to the course of the wall. Rather, a texturing path is superimposed. This means that the direction in which the at least one feed-in needle is moved along the printing path is not always identical to the direction of the course of the wall. The texturing path can therefore be also deemed as a deviation of the printing path from the path of progression, i.e. from the course of the wall. Here, the texturing path may affect just one or multiple sections of the printing path, so that the printing path corresponds to the path of progression along the other sections. Preferably, however, the texturing path not only affects just one or several sections, but the entire printing path.

Advantageously, the path of progression extends in the centre between the first lateral surface and the second lateral surface. In an additive manufacturing procedure, such as RLP, the wall to be produced is manufactured in multiple layers. Consequently, the strand of manufacturing material leaving the at least one feed-in opening and being introduced into the support material is arranged in multiple layers on top of one another. As a result, the wall to be produced grows with each layer by the diameter thereof. If the three-dimensional object is a prosthesis liner, for example, the path of progression extends in a spiral shape from the distal end of the prosthesis liner to the proximal end. Consequently, with each layer, so in this example with each turn of the spiral of the spiral-shaped path of progression, not only the wall grows, but also its first lateral surface and the second lateral surface opposite. Preferably, the path of progression extends in the centre between the position of the two lateral surfaces of the wall at the position of the wall to be produced by the respective layer. This may also, but does not have to be, the centre of the previous layer. Particularly in the event that the wall has an incline because, for example, the circumference of an object to be produced, such as a liner, changes, in particular increases, the path of progression for the current layer of the strand of manufacturing material to be introduced does not lie in the centre of the previous layer, but is offset from this center.

The path of progression is preferably spiral-shaped. Particularly preferably, the wall to be produced has a closed cross-section that is, for example, circular, oval, ellipsoid or free-form. It can preferably be parameterised by parameters such as a radius, diameter and/or radius of curvature.

The texturing path preferably contains at least one oscillation or consists of at least one such oscillation. The oscillation is preferably a sine wave, a triangle wave or a rectangular wave. The oscillation can preferably be parameterised by a wavelength and an amplitude. If the texturing path has at least one oscillation, this means that the printing path deviates alternately on both sides from the gradient path. The feed-in needle therefore deviates alternately to the left and right in the direction of movement of the feed-in needle along the printing path, from the path of progression and thus from the actual course of the wall. Here, a triangle wave or rectangular wave is characterised by the geometric form of this deviation. In the case of a triangle wave, the feed-in needle initially moves in a straight line in a direction away from the path of progression, then describes a tight curve, which can also be referred to as a link or corner, and then moves in a straight line again towards the path of progression. In the case of a rectangular wave, the feed-in needle first moves at a right angle away from the path of progression, then moves parallel to the path of progression across a pre-determined path, and then extends again at a right angle towards the path of progression.

By using at least one oscillation in the design of the texturing path, the first lateral surface and/or second lateral surface of the wall to be produced can be provided with a texture. The oscillation has a wavelength and an amplitude. Particularly in the case of a spiral-shaped design of the path of progression, where the path of progression extends in turns, interesting effects can be achieved. The wavelength can be designed in such a way that it fits into the length of a turn as an integer. In this case, the printing path deviates identically from the path of progression. The deviations occur either radially outwards or radially inwards. At the points at which the printing path deviates radially outwards in a turn, it also deviates radially outwards in the following turn. The same applies for a deviation radially inwards. This means that there is no phase shift of the oscillation of the texturing path from one turn to the next.

This is different to when the wavelength of the oscillation is not designed to fit into the length of a turn as an integer. In this case, phase shifts occur in consecutive turns, meaning that different effects and forms of the texture and structure can be achieved on the first lateral surface and/or the second lateral surface of the walls to be produced.

Preferably, the wavelength is greater than a diameter of the feed-in opening of the feed-in needle through which the stiffening material is introduced into the support material and/or greater than the thickness of the wall. The wavelength is preferably more than three times, especially preferably more than four times, as great. This is in contrast to the process known from FDM printing (FDM: Fused Deposition Modelling), in which a high wall thickness is created by a printing needle being guided along a printing path that has the narrowest possible serpentine lines. This renders it possible to produce a wall thickness that is significantly greater than the opening of the printing needle. The aim is to avoid a structure on the lateral surface of a wall produced in this manner, which is why the narrowest possible serpentine lines are used.

Preferably, the wavelength and/or the amplitude of at least one oscillation of the texturing path varies over the course of the texturing path. If the wavelength varies over the course of the texturing path, it results in a change in the structure or texture created on the first lateral surface and/or the second lateral surface and also in a variation in the aforementioned phase shift in a spiral-shaped course of the printing path. If the amplitude varies over the course of the texturing path, it results in a variation in the depth of the structure or texture created in the first lateral surface and/or second lateral surface.

Preferably, the texturing path features a superimposition of multiple oscillations or consists of such a superimposition. Each of the oscillations superimposed in this way can be a sine wave, a triangle wave or a rectangular wave. Of course, other types of oscillations are possible. The individual oscillations that are superimposed for the texturing path preferably have different wavelengths and/or different amplitudes.

In a preferred embodiment, the amplitude of at least one oscillation, preferably of all oscillations, of the texturing path corresponds at most to the wall thickness, preferably at most 75% of the wall thickness, preferably at most 50%, especially preferably at most 15% of the wall thickness. The selection of a larger amplitude is particularly, but not only, practical when a larger wavelength is to be achieved, i.e. the wall of the object is to be thickened in a spatially restricted area.

The invention also solves the addressed task by way of a method for creating a printing path for a method described here, which is characterised by the following steps:

providing object data of a three-dimensional object which contain information on the course of a wall of the object, providing texturing information which contains information on a desired texturing of the first lateral surface and/or the second lateral surface of the wall, determining a path of progression from the object data and of a texturing path from the texturing information,

creating the printing path by superimposing the path of progression with the texturing path.

The path of progression is determined from the macroscopic form and geometry of the three-dimensional object to be produced. A texture or structure to be provided in the first lateral surface or the second lateral surface has no influence here. For the texturing path, the texturing information is analysed. It contains information on the desired structure or texture of the first lateral surface and/or the second lateral surface. However, this information is generally not enough to generate a texturing path. Instead, the object data is usually also used for this purpose, as the texturing path to be used also depends on the geometry and form of the wall to be produced.

Preferably, only the texturing information as well as information on the dimensions of the first lateral surface and/or the second lateral surface are used to determine the texturing path. Particularly preferably, a Fourier transformation of the texturing information, in particular of the desired texture and structure, which is suitably parameterised, is carried out to determine a texturing path. In this way, the structure and texture can be converted into a superimposition of oscillations, preferably sine waves, which can then be used as a texturing path.

The desired texturing preferably contains a logo and/or lettering.

The at least one feed-in needle, through which the manufacturing material is introduced into the support material, has at least one feed-in opening, through which the manufacturing material leaves. This feed-in opening is usually directed backwards in the direction of movement of the feed-in needle. However, in a preferred embodiment, said feed-in opening points in a direction that forms an angle other than 0° and 180° with the direction of movement of the feed-in needle. Particularly preferably, the feed-in opening points in a direction that forms an angle of 90° with the direction of movement of the feed-in needle. To achieve this, in an especially preferred embodiment, an uncoiled or curved feed-in needle is used. This enables a surface structuring that is only pronounced on one lateral surface of the wall and is present on the opposite lateral surface in a weakened form or not at all. This slightly or not at all structured lateral surface is preferably the side facing the feed-in needle. The feed-in needle preferably smooths the previously introduced underlying layer when a layer of the manufacturing material is introduced, the result being that the respective lateral surface is formed with no or less structuring than the lateral surface of the wall facing away from the feed-in needle.

The wall is preferably made up of layers of the manufacturing material arranged on top of one another, wherein there is a phase shift of an oscillation of the texturing path between adjacent layers that preferably lies between 160° and 200°.

In a specific embodiment, a prosthesis liner is produced by means of the additive manufacturing process, said liner having a closed distal end, an open proximal end and a longitudinal direction that extends from the distal end to the proximal end. The wall of the prosthesis liner is created in an area between the distal end and the proximal end in which the feed-in needle describes a spiral-shaped printing path. In this way, the liner is built up layer by layer, starting from the distal end. From a pre-determined height, i.e. a pre-determined distance from the distal end along the longitudinal direction of the liner, the printing path is formed from a path of progression, which corresponds to the spiral, and a texturing path. For the texturing path, a sine wave with an amplitude of 0.2 mm, for example, is selected. In the example described, the wall thickness of the walls to be produced is 2 mm; the layer distance, i.e. the offset of the spiral after one revolution, is 0.5 mm, for example. The wavelength of the sine wave is selected in such a way that it does not fit into the circumference of the spiral as an integer and thus of the liner to be produced. In this embodiment example, 11.53 wavelengths fit in one circumference. The phase shift is approximately 190.8°. If the wavelength were selected to be slightly larger, so that precisely 11.5 wavelengths fit into a circumference of the liner, the phase shift would be 180°. It has been proven advantageous to have a varying wavelength. In a specific embodiment example, a wavelength U/11.53 is selected for a pre-determined number of revolutions of the spiral, U being the length of the circumference of the spiral. With this wavelength, 32 revolutions of the spiral are printed, for example. A different wavelength, for example U/11.47, is then selected, which is kept constant for a further 32 revolutions of the spiral. Arrow-like structures can thus be produced on the outer side, i.e. on a lateral wall of the prosthesis liner.

DESCRIPTION OF THE DRAWINGS

In the following, a number of embodiment examples of the invention will be explained in more detail with the aid of the accompanying drawings. They show FIG. 1—the schematic representation of an additive manufacturing process, FIG. 2-3—schematic representations of the path of progression and texturing path, FIGS. 4-5—the schematic representation of various three-dimensional objects and FIGS. 6a-6c—schematic representations of various printing paths.

DETAILED DESCRIPTION

Figure 4:
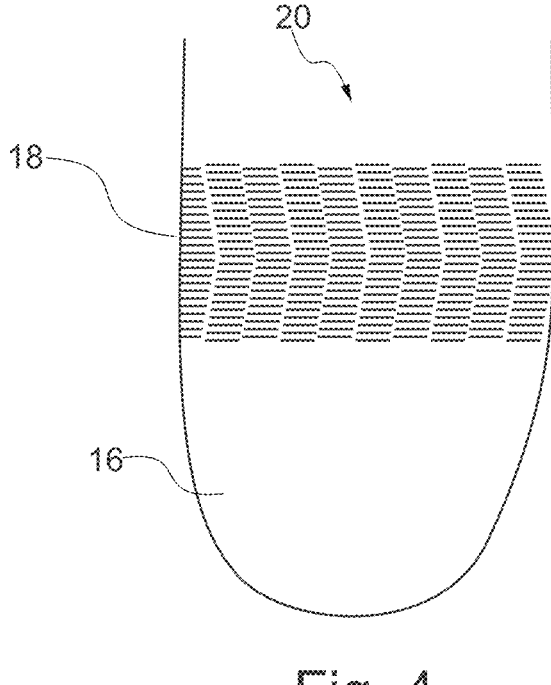

FIG. 1 schematically depicts how an RLP process works. A feed-in needle 2 is moved through a support material, not depicted, along a printing path, also not depicted separately in FIG. 1. In the embodiment example in FIG. 1, there is a feed-in opening 4 at the lower end of the feed-in needle 2 through which the manufacturing material 6 leaves. One can see that said material is applied in layers on top of one another, thereby forming a wall 8. In FIG. 1, this wall 8 does not have a structure or texture on either of the lateral surfaces. The printing path, along which the feed-in needle 2 is moved through the support material, corresponds to the course of the wall 8 and therefore only consists of one path of progression.

FIG. 2 illustrates such a path of progression 10, which is depicted as a dotted line. The course of this path of progression 10 corresponds to the course of the wall 8 to be produced. A texturing path is superimposed on the path of progression 10, the former being a sine wave in the embodiment example shown. The superimposition of the path of progression 10 with the texturing path creates the printing path 12, which is shown as a solid line. One can see that the printing path 12 deviates from the path of progression 10 alternately to the left and right. The maximum distance between the printing path 12 and the path of progression 10 corresponds to the amplitude of the sine wave that forms the texturing path. The distance between adjacent interfaces between the printing path 12 and the path of progression 10 corresponds to half the wavelength of the sine wave that forms the texturing path.

As depicted in FIG. 1, the wall 8 is usually constructed of multiple layers of the manufacturing material 6. For example, if a prosthesis liner is produced, the path of progression corresponds to a spiral-shaped path. Therefore, with this path of progression, after one turn, one layer of the manufacturing material is applied to an already existing layer of the manufacturing material. This situation is shown in FIG. 3. The path of progression 10 is once again identifiable as the dotted line. As in FIG. 2, one section of the printing path 12 is also depicted. In addition, a further section 14 of the printing path 12 is shown, which corresponds to the printing path 12 during a later revolution. The two sections of the printing path 12 therefore correspond to the positions at which manufacturing material is introduced from the feed-in needle 2 during consecutive revolutions of the printing path. One can see that there is a phase shift of almost 180° between the two sections of the printing path.

Figure 5:
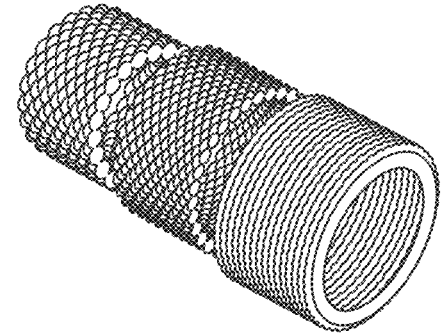

FIG. 4 shows a prosthesis liner 16, the base body of which has been produced in an RLP process. A structured area 18 can be seen, which has been produced with a method according to an embodiment example of the present invention. As shown in FIGS. 2 and 3, the sine wave superimposed onto the path of progression 10 leads to a structure on the lateral surfaces of the produced wall. This is represented by the line pattern 20. Each individual line corresponds to a bulge of the sine wave, which leads to an outwardly protruding bulge in the wall. A recessed bulge is created between two adjacent bulges. The phase shift results in the image depicted. In the lower area, the nodal points of the sine curve used as a texturing path shift from one layer to the adjacent layer to the right. Depending on the direction of the printing path, this means that the phase shift between two adjacent layers is slightly larger or slightly smaller than 180°, as illustrated in FIG. 3. The structure turns around in the upper area of the line pattern 20. The nodal points of the sine curve used as a texturing path shift to the left from layer to layer. The phase shift between adjacent layers is now slightly smaller or slightly larger than 180°, depending on the direction of the printing path. This allows different structures to be introduced into the lateral surfaces of the object to be produced. FIG. 5 shows three printed objects, a sine curve having been used as a texturing path, where the amplitude increases from object to object from right to left.

Figure 6A:
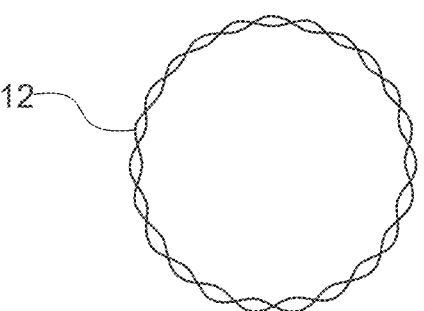
Figure 6B:
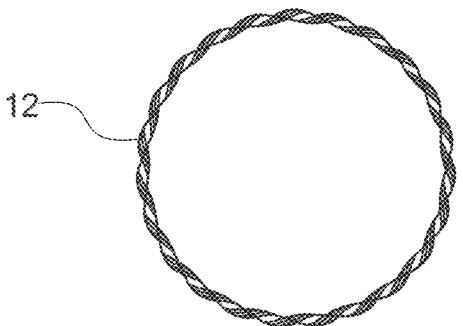
Figure 6C:
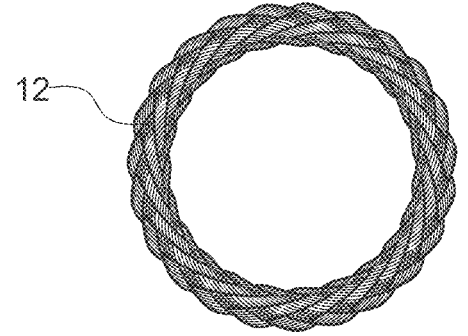

FIG. 6a illustrates a top view of a printing path 12, which is designed as a spiral-shaped printing path 12. Two superimposed layers are shown, which are arranged on top of each other in a direction perpendicular to the drawing plane. One can see that the texturing path is a sine curve, wherein there is a phase shift of approximately 180° between the adjacent layers. FIG. 6b shows further revolutions of this printing path 12. Here, it is clear that the phase shift is not exactly 180°. If one assumes that the printing path runs clockwise, the phase shift is slightly larger than 180°. FIG. 6c depicts the printing path with even more revolutions. On the one hand, one can see that the radius of the wall to be produced and thus the radius of the path of progression increases. In addition, the wavelength of the sine curve used as a texturing path has changed after a pre-determined number of revolutions, so that the phase shift is now slightly smaller than 180°.

REFERENCE LIST

2 feed-in needle
4 feed-in opening
6 manufacturing material
8 wall

8

10 path of progression
12 texturing path
14 section
16 liner
18 structured area
20 line pattern

The invention claimed is:

1. A method for producing at least one wall of a three-dimensional object, comprising:
performing an additive manufacturing process in which at least one manufacturing material is fed in a free-flowing state from at least one feed-in opening of at least one feed-in needle into a supporting material and then cures, wherein the at least one wall extends along a course of a wall which comprises a first lateral surface and a second lateral surface, wherein the second lateral surface is opposite the first lateral surface, and
moving the at least one feed-in needle through the supporting material along a printing path, wherein the printing path corresponds to a path of progression along the course of the wall on which a texturing path is superimposed,
wherein the texturing path contains or consists of one or more oscillations which have a wavelength and an amplitude,
wherein the wall is made up of layers of the manufacturing material arranged adjacent one another and wherein there is a phase shift of an oscillation of the texturing path between at least a portion of adjacent layers.

2. The method according to claim 1, wherein the path of progression extends in a center between the first lateral surface and the second lateral surface.

3. The method according to claim 1 wherein the oscillation is selected from the group consisting of a sine wave, a triangle wave, and a rectangular wave.

4. The method according to claim 1, further comprising varying the wavelength and/or the amplitude over the course of the wall on which the texturing path is superimposed.

5. The method according to claim 1 wherein the texturing path contains a superposition of multiple oscillations.

6. The method according to claim 1 wherein the amplitude corresponds at most to a thickness of the wall.

7. The method according to claim 1 wherein the amplitude corresponds at most to 75% of a thickness of the wall.

8. The method according to claim 1 wherein the amplitude corresponds at most to 50% of a thickness of the wall.

9. The method according to claim 1 wherein the phase shift lies between 160° and 200°.

10. A method for creating a printing path for a method according to claim 1, comprising:
providing object data of a three-dimensional object which contain information on a course of a wall of the three-dimensional object,
providing texturing information which contains information on a desired texturing of a first lateral surface and/or a second lateral surface of the wall,
determining a path of progression using the object data and of a texturing path using the texturing information, and
creating a printing path by superimposing the path of progression with the texturing path,
wherein the wall is made up of one or more layers of the manufacturing material arranged adjacent one another and
wherein there is a phase shift of an oscillation of the texturing path between at least a portion of adjacent layers.

11. The method according to claim 10 wherein the desired texturing contains a logo and/or lettering.

12. The method according to claim 10 wherein the phase shift lies between 160° and 200°.

\* \* \* \* \*